Patented Sept. 7, 1937

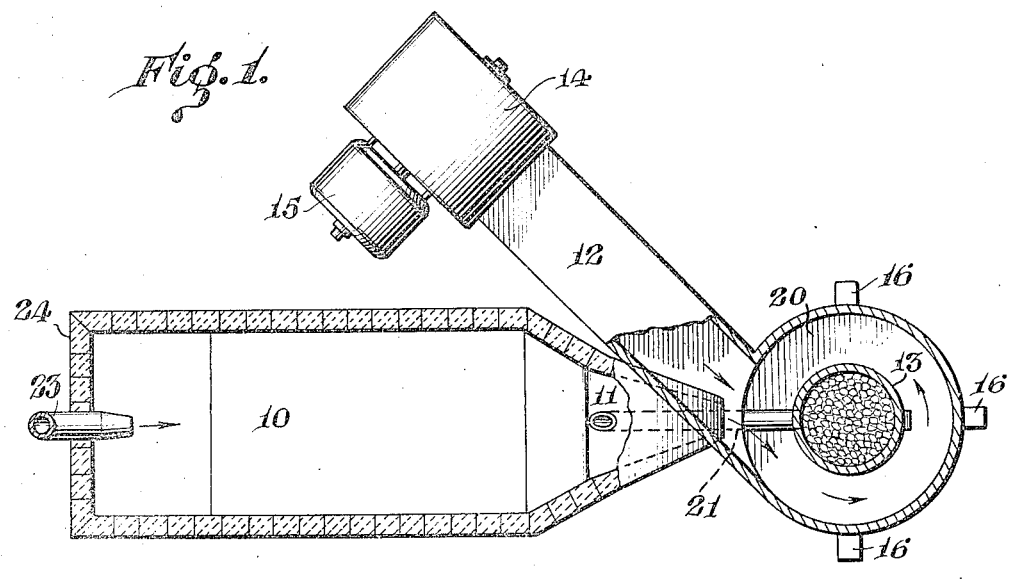
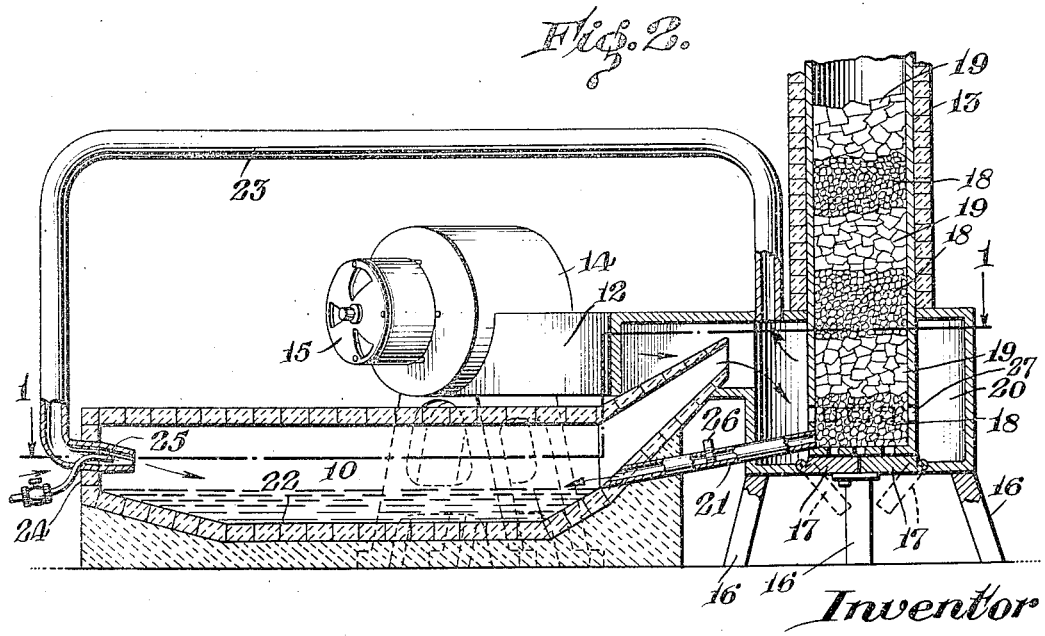

2,092,145

UNITED STATES PATENT OFFICE 2,092,145

FURNACE ASSEMBLY

Harry C. Wanner, Chicago, Ill.

Application August 27, 1934, Serial No. 741,617

1 Claim. (Cl. 263—27)

My invention relates to the assembly of a combined hearth furnace and vertical furnace.

Among the objects of my invention are to provide an assembly of a hearth furnace and a vertical furnace; to supply an assembly in which the hearth furnace and vertical furnace form a combination; to create a hearth furnace in which the ordinary type stack is eliminated; to supply a hearth furnace in which the vertical furnace functions as the stack; to provide an assembly wherein there is a direct connection between the vertical furnace and the hearth furnace through which the molten products of the vertical furnace pass to the hearth furnace; to supply an assembly wherein part of the hot gases from the hearth furnace serve as additional heating means for the vertical furnace and thus result in great economy in fuel and more rapid melting of the product; to create an assembly wherein part of the hot gases from the hearth furnace are returned to the hearth furnace for further use; to create an assembly of a combined vertical furnace and hearth furnace wherein the vertical furnace is the primary furnace since no original melting is done in the hearth furnace, and such other objects, advantages and capabilities as will later more fully appear and which are inherently possessed by my invention.

Referring to the drawing, Fig. 1 is a plan view of my assembly and Fig. 2 is a front sectional view in elevation.

While I have shown herein a preferred embodiment of my invention yet I wish it understood that the same is susceptible of modification and change without departing from the spirit of my invention.

Referring more particularly to the embodiment selected to illustrate my invention I employ a hearth furnace 10 which has at one end thereof a converging portion 11 connected with an air flue 12. Air for the air flue 12 is propelled by a fan 14 connected to a suitable propulsion means such as motor 15. The vertical furnace is preferably built with legs 16, drop doors 17 and when ready for operation has alternate horizontal layers of coke or other fuel 18 and iron or other product for melting 19. A tuyère ring 20 connects the vertical furnace 13 with the air flue 12. A passageway or trough 21 leads downwardly from a point adjacent the bottom portion of vertical furnace 13 to the floor 22 of hearth furnace 10. Leading from the tuyère ring 20 is a conduit 23 which leads back to the hearth furnace 10 through the end 24, said end 24 being substantially at the opposite end to converging portion 11.

Many attempts have been made to achieve the seeming impossible combination of economical melting as found in the vertical furnace, or cupola, and the accurate chemical control of products which can be obtained in the hearth, reverberatory or air furnace.

The vertical furnace, because of its construction, utilizes the heat generated in the melting zone, this heat being largely absorbed by the succeeding charges lying above, and preparing this metal for subsequent melting.

The hearth furnace allows the melter to hold the batch, make additions if needed, correct the temperature of the metal, and generally to achieve an exact condition before tapping out the batch. All of the above is available, however, at the expense of economical fuel ratios, and also results in slower melting speed. A very large amount of heat is permitted to escape, and the stack heat is very high.

A certain degree of improvement is accomplished by means of a combination of the two units, by using the vertical furnace as a primary melting unit, the molten product being run into the reverberatory furnace, and held until ready and suitable for tapping. This duplex system of melting is productive of some very good results. A very great wastage of fuel is present, however, when this duplex method is used.

In order to save the heat generated in the hearth, and apply it to a useful end, I have placed my vertical furnace approximately in the position customarily occupied by the stack, which is entirely omitted from my assembly. Exhaust gases from the hearth are led to the blower pipe 12 of the vertical furnace, and fed into this pipe at an angle, by use of the injector principle. These gases, at a very high temperature, are mixed with the air stream, raising the temperature thereof.

In this way, all of the heat ordinarily permitted to escape up the stack is run through the vertical furnace.

It has been definitely known that high temperature air produces greatly improved results in a vertical furnace. Not only is the required fuel lessened, but the quality of the metal is improved, and the melting time is greatly reduced.

Provision is also made to utilize a portion of the heated gas by returning it to the point where air ordinarily is admitted to the hearth furnace, where another fuel saving can be made.

In plants where a hearth furnace is already installed, my assembly can easily be placed in use; the removal of the stack and the installation of a vertical furnace, together with the connections as described herein, being the principal changes necessary.

Not only is my vertical furnace used as a stack for the hearth, but a trough is provided leading from the vertical furnace to the hearth furnace whereby the melted batch or batches are conveyed by gravity. Provision may be made to allow the molten metal to flow continuously, or the spout or trough may be stopped, a plug 26 being moved periodically. In either case, the various batches melted in the vertical furnace will mix with the molten bath in the hearth furnace and with each other.

It is my idea to employ the vertical furnace as the only furnace for producing the melts and to use the hearth furnace as a mixing means for holding the different batches from the vertical furnace. It is, of course, possible to also employ the hearth furnace as a furnace to produce melts together with the vertical furnace, whether the vertical furnace is used as a furnace or only as a stack for the hearth furnace.

Fuel is preferably supplied to the hearth furnace by line 25 which may be used to convey oil, gas or powdered coal. Air and gases enter the vertical furnace through a series of openings 27 which are spaced all the way around the wall, which wall holds in the fuel and melting stock.

Having thus described my invention I claim:

A furnace assembly comprising in combination a single separate primary vertical furnace and air flue, a tuyère ring connecting the primary vertical furnace with the air flue, a separate secondary hearth furnace having on one end a converging portion leading to the air flue, said primary vertical furnace placed with respect to said secondary hearth furnace so as to act as a stack therefore and to economically receive the heated gases from the secondary hearth furnace, a trough leading downwardly from the primary vertical furnace to the secondary hearth furnace so that melted stock may flow by gravity from the primary vertical furnace to the secondary hearth furnace, said trough having a closure means, a conduit leading from the tuyère ring to the secondary hearth furnace at the end opposite the converging portion so that heated gases may be passed from the primary vertical furnace to the secondary hearth furnace, and a blower pipe connected to the primary vertical furnace adjacent the secondary hearth furnace so that heated gases from the secondary hearth furnace are passed in to the primary vertical furnace.

HARRY C. WANNER.